(12) United States Patent
Hou et al.

(10) Patent No.: US 11,114,130 B2
(45) Date of Patent: Sep. 7, 2021

(54) METHOD AND DEVICE FOR PROCESSING VIDEO

(71) Applicant: Beijing Dajia Internet Information Technology Co., Ltd., Beijing (CN)

(72) Inventors: Peihong Hou, Beijing (CN); Yibing Ma, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/918,894

(22) Filed: Jul. 1, 2020

(65) Prior Publication Data
US 2020/0335136 A1 Oct. 22, 2020

(30) Foreign Application Priority Data

Jul. 2, 2019 (CN) .......................... 201910590062.5
Sep. 6, 2019 (CN) .......................... 201910843968.3

(51) Int. Cl.
*G11B 27/036* (2006.01)
*G06K 9/00* (2006.01)

(52) U.S. Cl.
CPC ........ *G11B 27/036* (2013.01); *G06K 9/00744* (2013.01)

(58) Field of Classification Search
CPC .......................... G11B 27/036; G06K 9/00744
See application file for complete search history.

(56) References Cited

U.S. PATENT DOCUMENTS

| 2012/0299986 | A1 | 11/2012 | Cheng |
| 2013/0150124 | A1* | 6/2013 | Kim ..................... G06F 16/9537 455/556.1 |
| 2014/0287806 | A1* | 9/2014 | Balachandreswaran ..................... A63F 13/212 463/7 |
| 2015/0123774 | A1* | 5/2015 | Ioffreda .................. G06F 3/165 340/407.1 |
| 2017/0200279 | A1* | 7/2017 | Zhong ..................... G06T 7/248 |

FOREIGN PATENT DOCUMENTS

| CN | 104851134 A | 8/2015 |
| CN | 106355153 A | 1/2017 |
| CN | 108322802 A | 7/2018 |
| WO | WO 2018/048078 A1 | 3/2018 |

* cited by examiner

*Primary Examiner* — Mishawn N. Hunter
(74) *Attorney, Agent, or Firm* — Knobbe, Martens, Olson & Bear, LLP

(57) ABSTRACT

The present disclosure provides a method and device for processing a video. The method includes: determining a special effect video frame of a video, where a target feature area of the special effect video frame includes a preset special effect map; and modifying a display effect of the special effect map upon determining that a shielded area exists in the target feature area.

18 Claims, 6 Drawing Sheets

METHOD AND DEVICE FOR PROCESSING VIDEO

CROSS-REFERENCE TO RELATED APPLICATION

This application is based on and claims priorities under 35 U.S.C 119 to Chinese Patent Application No. 201910590062.5, filed on Jul. 2, 2019, and Chinese Patent Application No. 201910843968.3, filed on Sep. 6, 2019, in the China National Intellectual Property Administration. The entire disclosure of the above applications is incorporated herein by reference.

FIELD

The embodiments of the present disclosure relate to the field of computers, and particularly relate to a method and device for processing a video.

BACKGROUND

Recently, with the continuous development of the short video industry and the continuous improvement of a real-time render technology, a user may add some visual special effects to a picture in real time while shooting a short video to increase the interestingness of the short video. For example, when shooting a portrait picture short video, the user may add some special effects of makeup materials to a figure in the picture to improve the attractiveness of the figure.

SUMMARY

The embodiments of the present disclosure provide a method and device for processing a video.

In a first aspect, the embodiment of the present disclosure provides a method for processing a video. The method includes: determining a special effect video frame of the video, where a target feature area of the special effect video frame comprises a preset special effect map; and modifying a display effect of the special effect map upon determining that a shielded area exists in the target feature area.

In some embodiments, the modifying the display effect of the special effect map includes: extracting a mask corresponding to a special effect video frame; determining a weight value of the special effect video frame based on topological relation information corresponding to the special effect video frame, the mask and a preset legal key point upon determining that the shielded area exists in the target feature area of the mask; generating a replacing video frame according to the special effect video frame and the weight value; and replacing the special effect video frame with the replacing video frame.

In some embodiments, the determining the weight value of the special effect video frame according to topological relation information corresponding to the special effect video frame, a mask and a preset legal key point includes: mapping the mask to an empty graph layer with a preset size according to the topological relation information, the mask and the preset legal key point; and obtaining the weight value based on channel information of the empty graph layer after setting transparency of the empty graph layer to a preset degree.

In some embodiments, before mapping the mask to the empty graph layer with the preset size according to topological relation information, the mask and the preset legal key point, the method further includes: obtaining a legal image with the preset size, where the legal image includes a target feature area; and extracting the preset legal key point from the target feature area.

In some embodiments, after obtaining the weight value based on channel information of the empty graph layer and by setting transparency of the empty graph layer to a preset degree, the method further includes: extracting a pixel value of each pixel in the empty graph layer; determining a swipe area value according to the pixel value of each pixel; and replacing the special effect map with another special effect map in response to the swipe area value being greater than or equal to a first preset threshold value.

In some embodiments, the determining the swipe area value includes: determining a plurality of target pixels whose pixel values are greater than or equal to a second preset threshold value from all the pixels of the empty graph layer; and taking a ratio of a sum of the pixel values of the plurality of target pixels to the number of the target pixels as the swipe area value.

In some embodiments, the extracting the pixel value of each pixel in the empty graph layer includes: sending the empty graph layer to a central processing unit through a graphics processor; and extracting the pixel value of each pixel in the empty graph layer through the central processing unit.

In some embodiments, the method further includes: determining the weight value of the special effect video frame based on the topological relation information, the mask and the preset legal key point upon determining that a non-mask area exists in the target feature area of the mask.

In some embodiments, the method further includes: extracting a plurality of video frames of the video based on a preset time period; collecting a plurality of target key points of target feature areas in the video frames; and determining the topological relation information based on relative position vector information among the plurality of target key points.

In some embodiments, the method further includes: increasing a size of the mask based on a preset multiple; and fuzzing the mask.

In a second aspect, the embodiment of the present disclosure provides a device for processing a video. The device includes a memory and at least one processor, where the at least one processor is configured to read and execute instructions stored in the memory to: determine a special effect video frame of a video, where a target feature area of the special effect video frame comprises a preset special effect map; and modify a display effect of the special effect map upon determining that a shielded area exists in the target feature area.

In some embodiments, the at least one processor is further configured to read and execute instructions stored in the memory to: extract a mask corresponding to the special effect video frame; determine a weight value of the special effect video frame based on topological relation information corresponding to the special effect video frame, the mask and a preset legal key point upon determining that the shielded area exists in the target feature area of the mask; generate a replacing video frame based on the special effect video frame and the weight value; and replace the special effect video frame with the replacing video frame.

In some embodiments, the at least one processor is further configured to read and execute instructions stored in the memory to: map the mask to an empty graph layer with a preset size based on the topological relation information, the mask, and the preset legal key point; and obtain the weight value based on channel information of the empty graph layer after setting transparency of the empty graph layer to a preset degree.

In some embodiments, the at least one processor is further configured to read and execute instructions stored in the memory to: obtain a legal image with the preset size, where the legal image includes the target feature area; and extract the preset legal key point from the target feature area.

In some embodiments, the at least one processor is further configured to read and execute instructions stored in the memory to: extract a pixel value of each pixel in an empty graph layer; determine a swipe area value according to the pixel value of each pixel; and replace the special effect map with another special effect map in response to the swipe area value being greater than or equal to a first preset threshold value.

In some embodiments, the at least one processor is further configured to read and execute instructions stored in the memory to: determine a plurality of target pixels whose pixel values are greater than or equal to a second preset threshold value from all the pixels of the empty graph layer; and take a ratio of a sum of the pixel values of the plurality of target pixels to the number of the target pixels as the swipe area value.

In some embodiments, the at least one processor is further configured to read and execute instructions stored in the memory to: send the empty graph layer to a central processing unit through a graphics processor; and extract a pixel value of each pixel in the empty graph layer through the central processing unit.

In some embodiments, the at least one processor is further configured to read and execute instructions stored in the memory to: determine the weight value of the special effect video frame based on the topological relation information, the mask and the preset legal key point upon determining that a non-mask area exists in the target feature area of the mask.

In some embodiments, the at least one processor is further configured to read and execute instructions stored in the memory to: extract a plurality of video frames of the video based on a preset time period; collect a plurality of target key points of target feature areas in the video frames; and determine the topological relation information based on relative position vector information among the plurality of target key points.

In some embodiments, the at least one processor is further configured to read and execute instructions stored in the memory to: increase a size of a mask according to a preset multiple; and fuzz the mask.

In a third aspect, the embodiment of the present disclosure provides a non-transitory storage medium. A computer program is stored on the storage medium, and when the computer program is executed by a processor, the method for processing a video according to the first aspect is implemented.

In a fourth aspect, the embodiment of the present disclosure further provides an application program, and when the application program is executed by a processor of an electronic device, operations of the method for processing a video provided in the present disclosure are implemented.

BRIEF DESCRIPTION OF THE DRAWINGS

By reading detailed description of preferred embodiments below, various other advantages and benefits will become clear to those of ordinary skills in the art. The drawings are only configured to show purposes of the preferred embodiments, and are not considered as limitations to the present disclosure. Furthermore, same reference symbols are configured to denote the same parts throughout the drawings.

DETAILED DESCRIPTION OF THE EMBODIMENTS

Hereinafter, exemplary embodiments of the present disclosure will be described in more detail with reference to drawings. Although the drawings show the exemplary embodiments of the present disclosure, it should be understood that the present disclosure may be implemented in various forms and should not be limited by the embodiments set forth herein. Rather, the embodiments are provided to enable a more thorough understanding of the present disclosure and to fully convey the scope of the present disclosure to those skilled in the art.

Figure 1:
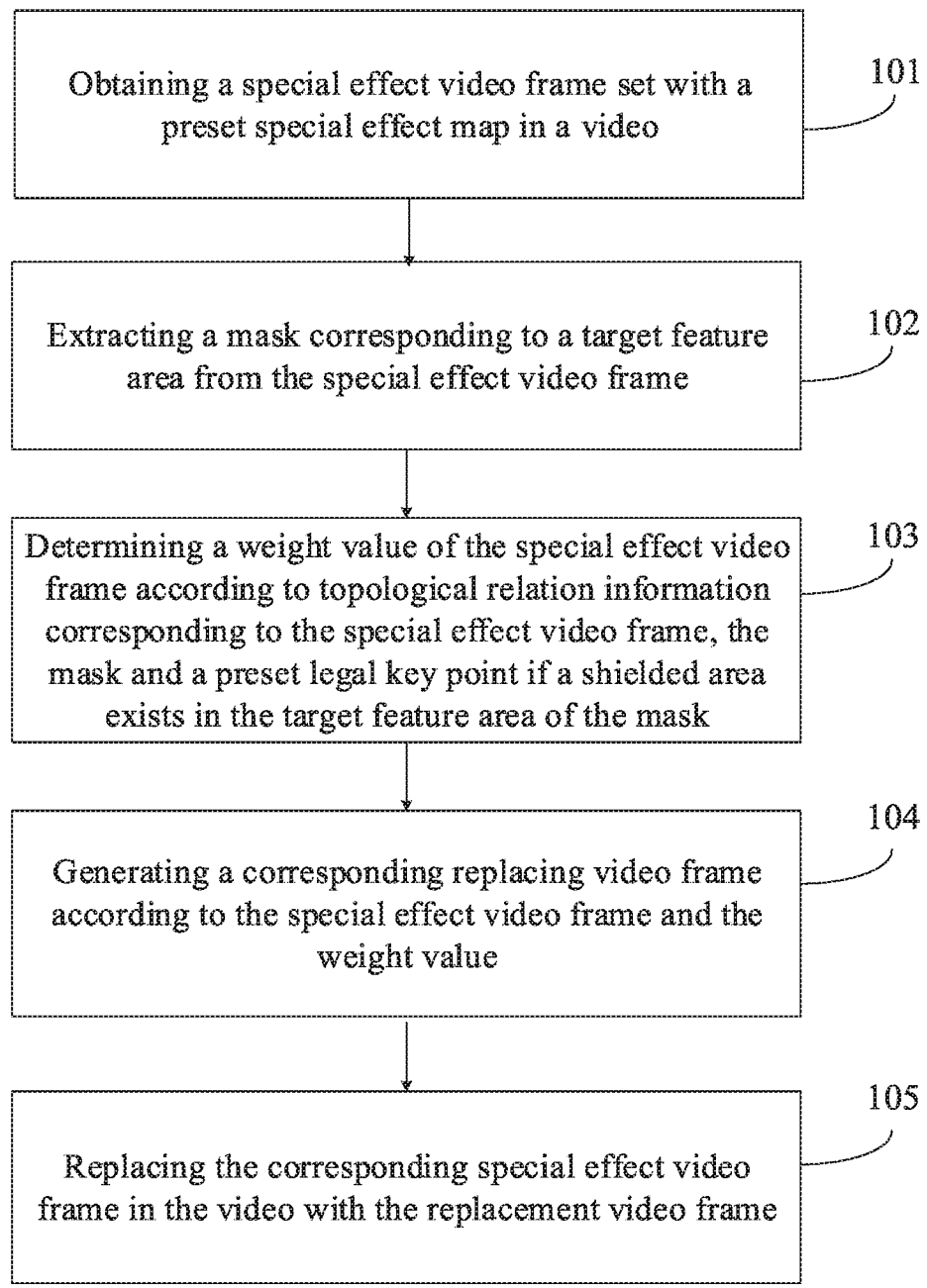
FIG. 1 is a flowchart of operations of a method for processing a video provided by the embodiments of the present disclosure.

FIG. 1 is a flowchart of operations of a method for processing a video provided by the embodiments of the present disclosure. As shown in FIG. 1, the method includes the following steps.

Step 101, a special effect video frame set with a preset special effect map in a video is obtained.

In the embodiments of the present disclosure, a short video application of a mobile terminal can call a camera of the mobile terminal to shoot a video. In the short video application, a large number of special effect maps are preset. A user may select a corresponding special effect map, and the corresponding special effect map is attached to a video picture to increase attractiveness of the video picture.

In some embodiments, the special effect map is rendered to an empty graph layer corresponding to a video frame through a real-time graphics rendering technology, to obtain the special effect video frame.

For example, for a portrait video picture, assuming that the user determines an eye makeup special effect map A and a lip makeup special effect map B, the user may render the eye makeup special effect map A to a graph layer a of the video frame in the video frame of a video and render the lip makeup special effect map B to a graph layer b of the video frame, thereby obtaining a special effect video frame (A+a) and a special effect video frame (B+b).

Step 102, a mask corresponding to a target feature area is extracted from the special effect video frame.

In the embodiments of the present disclosure, determination of the mask is a processing process that a processed image is (wholly or partially) shielded through a selected image, figure or object to control an image processing area. The mask is configured to extract a region of interest in an image to be processed, namely, a pre-made region of interest mask is multiplied by the image to be processed to obtain an image of the region of interest, where an image value in the region of interest remains unchanged, and image values outside the region are all 0. The mask further has a shielding effect. The mask is configured to shield certain areas on the image so as to prevent the certain areas from participating in processing or calculation of processing parameters, or only process or count the shielded areas. The mask may further achieve structural feature extraction, namely, a structural feature, similar to the mask, in the image is detected and extracted through a similarity variable method or an image matching method.

In some embodiments, in the special effect video frame, the mask corresponding to the target feature area may be extracted through related codes of mask extraction in an Open Source Computer Vision Library (opencv), and the mask corresponding to the target feature area may be output and obtained by inputting a special effect video frame image into the opencv and dividing the target feature area. For portrait processing in the video, the target feature area may be a face area.

Figure 2:
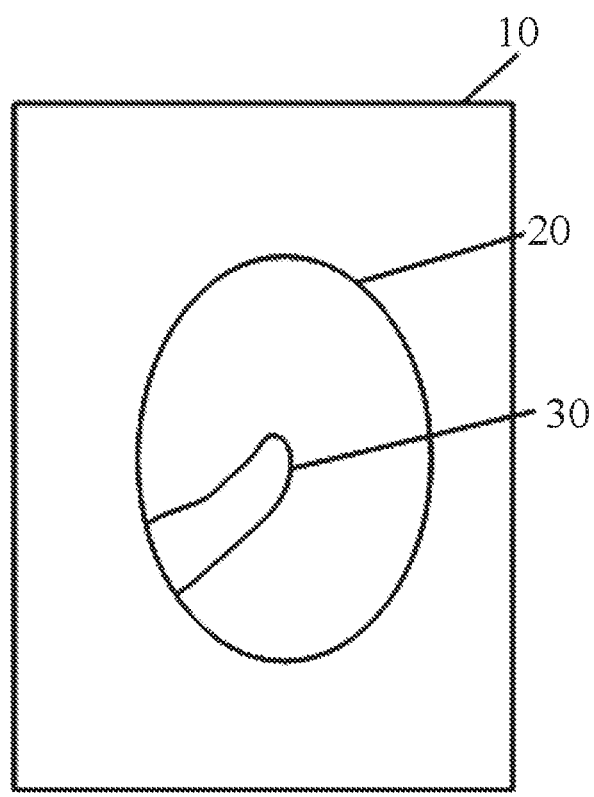
FIG. 2 is a mask provided by the embodiments of the present disclosure.

FIG. 2 shows a mask provided by the embodiments of the present disclosure. FIG. 2 shows a mask 10 obtained by extracting a face area 20 of a portrait image, and a part of the face area is shielded with a finger when a user shoots the portrait image, so that a corresponding hand shielded area 30 exists in the mask 10. In the mask 10, an area, without the hand shielded area 30, in the face area 20 may serve as a mask area, so that interference in the mask area by processing of a makeup special effect in the face area 20 can be avoided in the later period.

Step 103, if a shielded area exists in the target feature area of the mask, a weight value of the special effect video frame is determined according to topological relation information corresponding to the special effect video frame, the mask and a preset legal key point.

In this step, referring to FIG. 2, if it is detected that the shielded area 30 exists in the mask 10, the weight value of the special effect video frame may be determined according to the topological relation information corresponding to the special effect video frame, the mask, and the preset legal key point.

In the scene of processing of a portrait, the special effect video frame may be a face image, and acquisition of the topological relation information corresponding to the face image may include: selecting a plurality of key points in the face image through a face detection technology, and further determining a mesh topological connection relation among an expansion point and the plurality of key points based on the plurality of key points so as to obtain the topological relation information corresponding to the special effect video frame.

In addition, determination of the legal key points may include: selecting a standard face image, selecting a plurality of standard key points in the standard face image through the face detection technology, and taking the plurality of standard key points as the legal key points.

In the embodiments of the present disclosure, determining the weight value of the special effect video frame according to the topological relation information corresponding to the special effect video frame, the mask and the preset legal key point may include: mapping the mask to an empty graph layer with a preset size according to the legal key point and a mapping relation expressed by the topological relation information, where after corresponding transparency is set for the empty graph layer, the empty graph layer records all rendering results of a rendering operation on a special effect map in the special effect video frame before the current moment, and the results may be reflected by channel information of the empty graph layer. Therefore, the weight value of the special effect video frame may be further determined through the channel information of the empty graph layer.

Step 104, a corresponding replacing video frame is generated according to the special effect video frame and the weight value.

In this step, if there is only one special effect video frame, after the special effect video frame and the weight value of the special effect video frame are determined, related parameters of the special effect map in the special effect video frame may be multiplied by the weight value to obtain a modified replacement video frame, where compared with the original special effect video frame, special effect display intensity of the special effect map of the replacement video frame is changed. According to different weight values, changes of the special effect display intensity include but are not limited to enhancement, reduction, complete erasure and the like.

If there are a plurality of special effect video frames, after the special effect video frames and weight values of the special effect video frames are determined, the plurality of special effect video frames may be subjected to weighted mix to obtain a mixed replacement video frame. The mixed replacement video frame has a plurality of special effect maps, and the different special effect maps have different display effects in the replacement video frame according to the corresponding different weight values.

Step 105, the corresponding special effect video frame in the video is replaced with the replacement video frame.

In this step, after the corresponding special effect video frame in the video is replaced with the replacement video frame, in a process of playing the video, the special effect display intensity of the corresponding special effect map in the video is changed under an effect of the weight value so as to achieve the purpose of modifying the special effect display intensity of the special effect map.

In summary, by means of a method for processing a video provided by the embodiments of the present disclosure, the special effect video frame set with the preset special effect map in the video may be obtained. In the special effect video frame, the mask corresponding to the target feature area is extracted. If the shielded area exists in the target feature area of the mask, the weight value of the special effect video frame is determined according to the topological relation information corresponding to the special effect video frame, the mask and the preset legal key point. According to the special effect video frame and the weight value, the corresponding replacement video frame is generated. The replacement video frame replaces the corresponding special effect video frame in the video. In the present disclosure, through the mask with the shielded area, the topological relation information corresponding to the special effect video frame and the legal key point, the weight value of a correction degree of the special effect map is determined. When shooting the video, the user may shield an area with the special effect map through a body or other objects to achieve real-time special effect display intensity adjustment of the special effect map in the area, and during an entire adjustment process, the user only needs to shield a picture instead of setting the related parameters, so that a process of the special effect display intensity adjustment is simplified, and smoothness of the special effect display intensity adjustment is improved.

Figure 3:
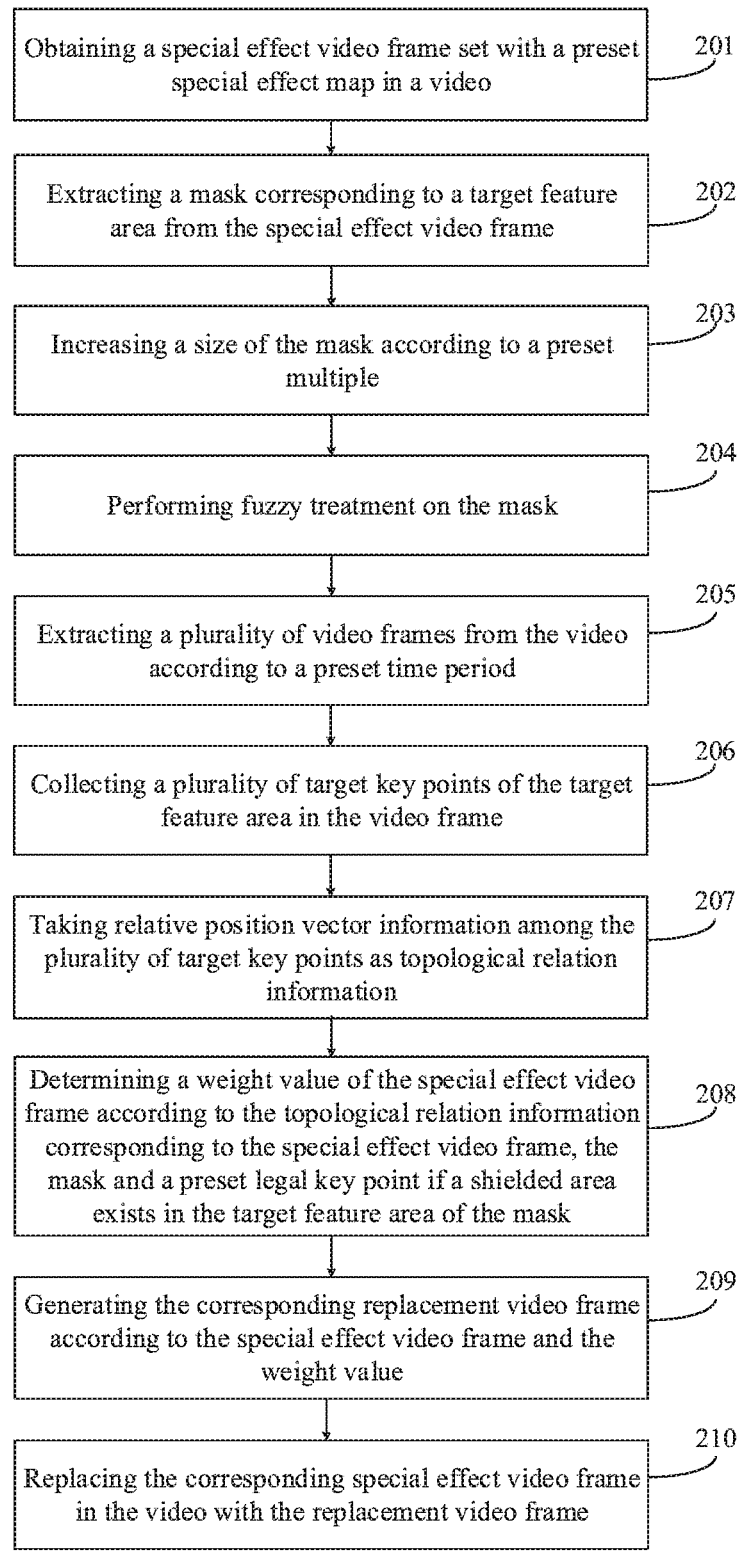
FIG. 3 is a flowchart of operations of another method for processing a video provided by the embodiments of the present disclosure.

FIG. 3 is a flowchart of steps of another method for processing a video provided by the embodiments of the present disclosure. As shown in FIG. 3, the method may include the following steps.

Step 201, a special effect video frame set with a preset special effect map in a video is obtained.

Implementation of this step is similar to implementation of step 101 above, so the implementation of this step will not be described in detail in the embodiments of the present disclosure.

Step 202, in the special effect video frame, a mask corresponding to a target feature area is extracted.

Implementation of this step is similar to implementation of step 102 above, so the implementation of this step will not be described in detail in the embodiments of the present disclosure.

Step 203, a size of the mask is increased according to a preset multiple.

In the embodiments of the present disclosure, since a picture in the video is displayed dynamically, a position of the target feature area in the picture will further change continuously along with dynamic changes of the video picture. The mask may be unable to cover the target feature area, resulting in incomplete correction of the special effect map.

Therefore, in this step, the size of the mask may be enlarged by the preset multiple, so that the mask can always completely cover the target feature area during the dynamic changes of the video picture.

For example, in the video with a portrait picture, a person often moves his/her head, such as turning the head and nodding. After the size of the mask corresponding to a face area is enlarged, it may be ensured that when the head is turned in the picture, the face area can be completely covered with the mask, so that mistreatment of the special effect map is avoided.

Step 204, fuzzy treatment is performed on the mask.

In the embodiments of the present disclosure, after the size of the mask is enlarged, fuzzy treatment may be further performed on the mask. Specifically, a linear interpolation method may be adopted to perform the fuzzy treatment, wherein the fuzzy treatment of the mask may further specifically be feathering treatment on an edge of the mask. The purpose of performing the fuzzy treatment on the mask is to enhance softness of a processing effect of the special effect map, and to avoid a too sharp processing effect of the special effect map.

Step 205, a plurality of video frames in the video are extracted according to a preset time period.

In this step, the video frame may be extracted from the beginning of the video every preset time period until the end of the video, and finally the plurality of video frames are obtained. In addition, video frame extraction may further be carried out in the video in a random order according to the preset time period to obtain the plurality of video frames, which is not limited in the embodiments of the present disclosure.

Step 206, a plurality of target key points of the target feature area in the video frame are collected.

In the embodiments of the present disclosure, the plurality of target key points of the target feature area in the video frame may be selected through a key point detection technology.

For example, for a portrait processing scene, the plurality of key points in a face image may be selected through a face detection technology, where the key points are often location points of a facial feature outline in a portrait.

Step 207, relative position vector information among the plurality of target key points is taken as topological relation information.

In this step, on the basis of the plurality of key points, an expansion point connected to the key point and the relative position vector information among the plurality of key points are further determined, so that topological relation information corresponding to the special effect video frame is obtained, wherein the expansion point and the relative position vector information among the plurality of key points may be selected by a graphic designer.

Step 208, if a shielded area exists in the target feature area of the mask, a weight value of the special effect video frame is determined according to the topological relation information corresponding to the special effect video frame, the mask and a preset legal key point.

Implementation of this step is similar to implementation of step 103 above, so the implementation of this step will not be described in detail in the embodiments of the present disclosure.

In some embodiments, step 208 may include sub-step 2081.

Sub-step 2081, if a non-mask area exists in the target feature area of the mask, the weight value of the special effect video frame is determined according to the topological relation information corresponding to the special effect video frame, the mask and the preset legal key point.

In the embodiments of the present disclosure, if there is an area with a pixel value 0 in the target feature area of the mask, the area with the pixel value 0 may be determined as the non-mask area. The non-mask area is configured to reflect the shielded area. In the mask, a background area outside the non-mask area and the target feature area may be transparent. A mask area is an area of interest, and a pixel value of an image in the mask area remains non-zero and unchanged.

In some embodiments, step 208 may further include sub-steps 2082-2088.

Sub-step 2082, a legal image of a preset size is obtained. The legal image includes the target feature area.

In this step, in the portrait processing scene, the legal image with the preset size may be a standard face front view with a preset size; and through a face recognition technology, the face area of the standard face front view may be determined as the target feature area.

Sub-step 2083, the legal key point is extracted from the target feature area of the legal image.

In this step, in the portrait processing scene, through the face detection technology, the legal key point may be extracted from the face area of the standard face front view, and the legal key point may be a point on the facial feature outline.

Sub-step 2084, the mask corresponding to the video frame image is mapped to an empty graph layer with a preset size according to the topological relation information, the mask and the legal key point.

In this step, the topological relation information may include a grid diagram constructed by the key points according to relative position vectors among the key points, where a triangular grid is formed among the key points, by combining the topological relation information and the legal key point, the mask corresponding to the video frame image may be mapped to the empty graph layer with the preset size in a legal way, and all rendering results of rendering operation on the special effect map in the special effect video frame before the current time may be reflected by channel information of the empty graph layer.

Sub-step 2085, after transparency to the empty graph layer is set to a preset degree, the weight value of the special effect video frame is obtained according to the channel information of the empty graph layer.

In this step, after the transparency of the empty graph layer is set to the preset degree, the empty graph layer is changed from a previous rgb (red channel, green channel, blue channel) format to an rgba (red channel, green channel, blue channel, transparent channel) format, so that the weight value of the special effect video frame may be obtained according to the channel information of the empty graph layer, where a degree value of the transparency may be determined by the graphic designer.

For example, assuming that a user determines an eye makeup special effect map A and a lip makeup special effect map B, the user may render the eye makeup special effect map A to a graph layer a of the video frame in the video frame of the video, and render the lip makeup special effect map B to a graph layer b of the video frame, so as to obtain a special effect video frame (A+a) and a special effect video frame (B+b).

Mixing the special effect video frame (A+a) and the special effect video frame (B+b) by using the channel information of the empty graph layer to obtain a corresponding replacement video frame includes: setting a pixel color on the special effect video frame (A+a) as ColorCA (u, v), where u and the v are texture coordinates. A pixel color on the special effect video frame (B+b) is ColorCB (u, v). A color of the transparent channel in the empty graph layer is alpha (u,v), then a color of each pixel in the replacement video frame is ColorC (u,v), ColorC (u,v)=ColorCA (u,v)× Alpha (u,v)+ColorCB (u,v)×(1−Alpha (u, v)), wherein the Alpha (u,v) may serve as a weight value of the special effect video frame (A+a), and the (1−Alpha (u, v)) may serve as a weight value of the special effect video frame (B+b).

In sub-step 2086, the pixel value of each pixel in the empty graph layer is extracted.

In some embodiments, sub-step 2086 may further include sub-steps A1 and A2.

Sub-step A1, the empty graph layer is sent to a central processing unit through a graphics processor.

In the embodiments of the present disclosure, other operations before sub-step 2086 are implemented through the graphics processor. When pixel value extraction of each pixel in the empty graph layer is started, the empty graph layer may be sent to the central processing unit through the graphics processor, and the central processing unit realizes the pixel value extraction of each pixel in the empty graph layer, which may improve extraction efficiency.

Sub-step A2, the pixel value of each pixel in the empty graph layer is extracted through the central processing unit.

In this step, the central processing unit realizes the pixel value extraction of each pixel in the empty graph layer, which may improve the extraction efficiency.

In sub-step 2087, a swipe area value is determined according to the pixel value corresponding to each pixel.

In this step, determining the swipe area value according to the pixel value corresponding to each pixel includes: from all the pixels, target pixels whose pixel values are greater than a preset pixel value are selected, the pixel values of the target pixels are summed up, and a result of sum is divided by the number of the target pixels to obtain the swipe area value.

In sub-step 2088, if the swipe area value is greater than or equal to a preset threshold value, the special effect map in the special effect video frame is replaced with another special effect map.

In the embodiments of the present disclosure, a swipe area may be configured to reflect a degree to which the target feature area of the special effect video frame is affected by the shielded area. Therefore, according to the swipe area value, when to perform the next special effect map correction may be judged. Specifically, after the corresponding transparency of the empty graph layer is set, the empty graph layer records rendering results of all the rendering operations on the special effect map in the special effect video frame before the current moment, and when the swipe area value is greater than or equal to the preset threshold value, the special effect map in the special effect video frame may be replaced with another special effect map.

For example, if there are the two special effect maps A and B, as well as the special effect video frame (A+a) and the special effect video frame (B+b) corresponding to the two special effect maps A and B, when the swipe area value is greater than or equal to the preset threshold value, the special effect maps A and B in the special effect video frame (A+a) and the special effect video frame (B+b) may be exchanged. The purpose of exchanging respective weight values of the special effect video frame (A+a) and the special effect video frame (B+b) is achieved and reflected in the video picture, namely, the user may achieve an effect of exchanging the special effect maps A and B in the picture through influences of the shielded area on the target feature area.

In addition, the special effect maps A and B in the special effect video frame (A+a) and the special effect video frame (B+b) may further be replaced with new special effect maps C and D to obtain a special effect video frame (C+a) and a special effect video frame (D+b), and respective weight values of the special effect video frame (A+a) and the special effect video frame (B+b) are assigned to the corresponding special effect video frame (C+a) and the corresponding special effect video frame (D+b). It is reflected in the video picture, namely, the user may achieve the purpose of replacing the special effect maps A and B in the picture with the other special effect maps C and D through the influences of the shielded area on the target feature area.

Step 209, the corresponding replacement video frame is generated according to the special effect video frame and the weight value.

Implementation of this step is similar to implementation of step 104 above, so the implementation of this step will not be described in detail in the embodiments of the present disclosure.

Step 210, the corresponding special effect video frame in the video is replaced with the replacement video frame.

Implementation of this step is similar to implementation of step 105 above, so the implementation of this step will not be described in detail in the embodiments of the present disclosure.

In summary, by means of another method for processing a video provided by the embodiments of the present disclosure, the special effect video frame set with the preset special effect map in the video may be obtained. The mask corresponding to the target feature area is extracted from the special effect video frame. If the shielded area exists in the target feature area of the mask, the weight value of the special effect video frame is determined according to the topological relation information corresponding to the special effect video frame, the mask and the preset legal key point. According to the special effect video frame and the weight value, the corresponding replacement video frame is generated. The replacement video frame replaces the corresponding special effect video frame in the video. In the present disclosure, through the mask with the shielded area, the topological relation information corresponding to the special effect video frame and the legal key point, the weight value of a correction degree of the special effect map is determined. When shooting the video, the user may shield an area with the special effect map through a body or other objects to achieve real-time special effect display intensity adjustment of the special effect map in the area, and during an entire adjustment process, the user only needs to shield a picture instead of setting related parameters, so that a process of the special effect display intensity adjustment is simplified, and smoothness of the special effect display intensity adjustment is improved.

Figure 4:
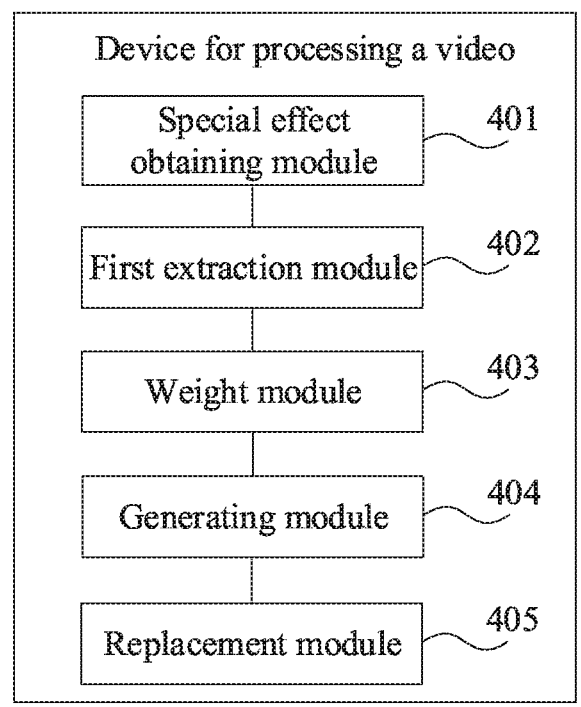
FIG. 4 is a block diagram of a device for processing a video provided by the embodiments of the present disclosure.

FIG. 4 is a block diagram of a device for processing a video provided by the embodiments of the present disclosure. As shown in FIG. 4, the device includes a special effect obtaining module 401, a first extraction module 402 and a weight module 403.

The special effect obtaining module 401 is configured to obtain a special effect video frame set with a preset special effect map in a video.

The first extraction module 402 is configured to extract a mask corresponding to a target feature area from the special effect video frame.

The weight module 403 is configured to determine a weight value of the special effect video frame according to topological relation information corresponding to the special effect video frame, the mask and a preset legal key point if a shielded area exists in the target feature area of the mask.

In some embodiments, the weight module 403 includes a mapping sub-module, a weight sub-module, an obtaining sub-module, a first extraction sub-module and a second extraction sub-module.

a mapping sub-module is configured to map the mask corresponding to a video frame image to an empty graph layer with a preset size according to the topological relation information, the mask and the legal key point.

The weight sub-module is configured to obtain the weight value of the special effect video frame according to channel information of the empty graph layer after transparency to the empty graph layer is set to a preset degree.

The obtaining sub-module configured to obtain a legal image of a preset size, wherein the legal image includes the target feature area.

The first extraction sub-module configured to extract the legal key point in the target feature area of the legal image.

The second extraction sub-module is configured to extract a pixel value of each pixel in the empty graph layer.

In some embodiments, the second extraction sub-module is further configured to: send the empty graph layer to a central processing unit through a graphics processor, and extract the pixel value of each pixel in the empty graph layer through the central processing unit.

A determination sub-module is configured to determine a swipe area value according to the pixel value corresponding to each pixel.

A replacement sub-module is configured to replace the special effect map in the special effect video frame with another special effect map if the swipe area value is greater than or equal to a preset threshold value.

Optionally, the weight module 403 is further configured to: determine the weight value of the special effect video frame according to the topological relation information corresponding to the special effect video frame, the mask and the preset legal key point if a non-mask area exists in the target feature area of the mask.

A generating module 404 is configured to generate a corresponding replacement video frame according to the special effect video frame and the weight value.

A replacement module 405 is configured to replace the corresponding special effect video frame in the video with the replacement video frame.

In some embodiments, the device further includes the following modules: a second extraction module configured to extract a plurality of video frames in the video according to a preset time period; a collection module configured to collect a plurality of target key points of the target feature area in the video frame; a position determination module configured to take relative position vector information among the plurality of target key points as the topological relation information; an enlargement module configured to increase a size of the mask according to a preset multiple; and a fuzzy module configured to perform fuzzy treatment on the mask.

In summary, by means of the video processing apparatus provided by the embodiments of the present disclosure, the special effect video frame set with the preset special effect map in the video may be obtained. The mask corresponding to the target feature area is extracted from the special effect video frame. If the shielded area exists in the target feature area of the mask, the weight value of the special effect video frame is determined according to the topological relation information corresponding to the special effect video frame, the mask and the preset legal key point. According to the special effect video frame and the weight value, the corresponding replacement video frame is generated. The replacement video frame replaces the corresponding special effect video frame in the video. In the present disclosure, through the mask with the shielded area, the topological relation information corresponding to the special effect video frame and the legal key point, the weight value of a correction degree of the special effect map is determined. When shooting the video, the user may shield an area with the special effect map through a body or other objects to achieve real-time special effect display intensity adjustment of the special effect map in the area, and during an entire adjustment process, the user only needs to shield a picture instead of setting related parameters, so that a process of the special effect display intensity adjustment is simplified, and smoothness of the special effect display intensity adjustment is improved.

Figure 5:
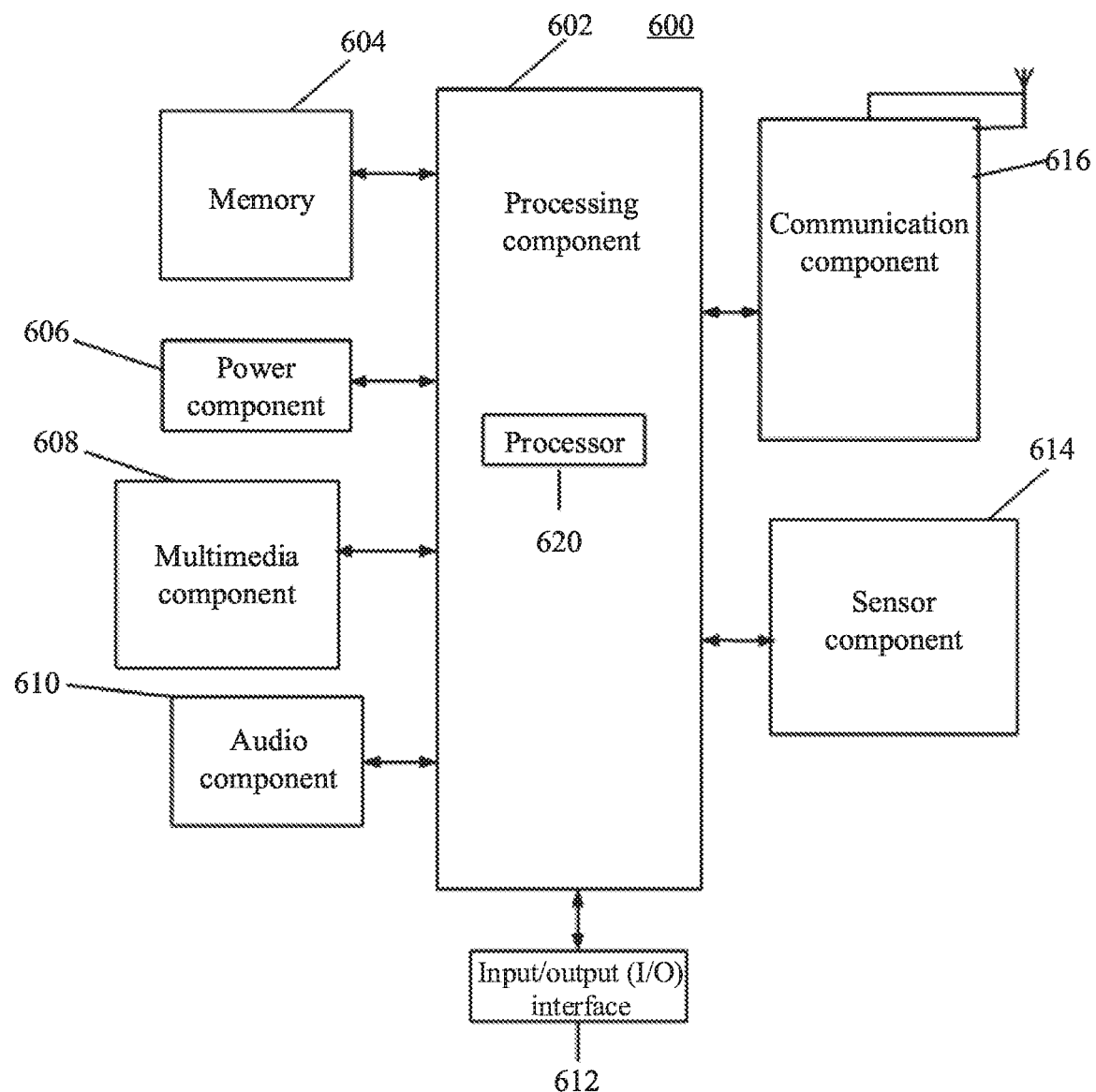
FIG. 5 is a logic block diagram of an electronic device according to an embodiment of the present disclosure.

FIG. 5 is a block diagram of an electronic device 600 according to an exemplary embodiment. For example, the electronic device 600 may be a mobile phone, a computer, a digital broadcasting terminal, messaging device, a game console, tablet device, medical device, fitness device, a personal digital assistant or the like.

Referring to FIG. 5, the electronic device 600 may include one or more of the following components: a processing component 602, a memory 604, a power component 606, a multimedia component 608, an audio component 610, an input/output (I/O) interface 612, a sensor component 614 and a communication component 616.

The processing component 602 generally controls overall operation of the electronic device 600, such as operation associated with displaying, telephone calling, data communication, camera operation, and recording operation. The processing component 602 may include one or more processors 620 to execute an instruction to complete all or part of steps in the above method.

In addition, the processing component 602 may include one or more modules to facilitate interaction between the processing component 602 and other components. For example, the processing component 602 may include a multimedia module to facilitate interaction between the multimedia component 608 and the processing component 602.

The memory 604 is configured to store various types of data to support the operation on the electronic device 600. Examples of the data include the instruction for any application or method operated on the electronic device 600, contact data, phone book data, a message, a picture, a video, and the like. The memory 604 may be achieved by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power component 606 provides power to various components of the electronic device 600. The power component 606 may include a power management system, one or more power sources, and other components associated with generating, managing, and distributing power of the electronic device 600.

The multimedia component 608 includes a screen that provides an output interface between the electronic device 600 and a user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touch, swipe, and gestures on the touch panel. The touch sensor may not only sense a boundary of a touch or swipe action, but also detect duration and pressure related to touch or swipe operation. In some embodiments, the multimedia component 608 includes a front camera and/or a rear camera. When the electronic device 600 is in an operation mode, such as a shooting mode or a video mode, the front camera and/or the rear camera may receive external multimedia data. Each of the front camera and the rear camera may be a fixed optical lens system or have focal length and optical zoom capability.

The audio component 610 is configured to output and/or input an audio signal. For example, the audio component 610 includes a microphone (MIC). When the electronic device 600 is in the operation mode, such as a call mode, a recording mode, and a voice recognition mode, the microphone is configured to receive the external audio signal. The received audio signal may be further stored in the memory 604 or transmitted via the communication component 616. In some embodiments, the audio component 610 further includes a speaker configured to output the audio signal.

The I/O interface 612 provides an interface between the processing component 602 and a peripheral interface module. The peripheral interface module may be a keyboard, a click wheel, a button or the like. The buttons may include but are not limited to a home button, a volume button, a start button, and a lock button.

The sensor component 614 includes one or more sensors configured to provide status assessment of various aspects for the electronic device 600. For example, the sensor component 614 may detect an on/off state of the electronic device 600, and relative positioning of the components, for example, the components are a display and a keypad of the electronic device 600, and the sensor component 614 may further detect position change of the electronic device 600 or one of the components of the electronic device 600, presence or absence of contact between the user and the electronic device 600, orientation or acceleration/deceleration of the electronic device 600, and temperature change of the electronic device 600. The sensor component 614 may include a proximity sensor configured to detect presence of a nearby object without any physical contact. The sensor component 614 may further include an optical sensor, such as a CMOS or CCD image sensor, configured to being used in an imaging application. In some embodiments, the sensor component 614 may further include an acceleration sensor, a gyro sensor, a magnetic sensor, a pressure sensor, or a temperature sensor.

The communication component 616 is configured to facilitate wired or wireless communication between the electronic device 600 and another device. The electronic device 600 may access a wireless network based on a communication standard, such as WiFi, an operator network (such as 2G, 3G, 4G, or 5G), or a combination thereof. In the exemplary embodiment, the communication component 616 receives a broadcast signal or broadcast related information from an external broadcast management system via a broadcast channel In the exemplary embodiment, the communication component 616 further includes a near field communication (NFC) module to facilitate short-range communication. For example, the NFC module may be implemented based on a radio frequency identification (RFID) technology, an infrared data association (IrDA) technology, an ultra-wideband (UWB) technology, a bluetooth (BT) technology and other technologies.

In some embodiments, the electronic device 600 may be implemented by one or more application specific integrated circuits (ASIC), digital signal processors (DSP), digital signal processing devices (DSPD), programmable logic devices (PLD), field programmable gate array (FPGA), controllers, microcontrollers, microprocessors or other electronic components to be configured to obtain a special effect video frame set with a preset special effect map set in a video. In the special effect video frame, a mask corresponding to a target feature area is extracted. If a shielded area exists in the target feature area of the mask, a weight value of the special effect video frame is determined according to topological relation information corresponding to the special effect video frame, the mask and a preset legal key point. A corresponding replacement video frame is generated according to the special effect video frame and the weight value. The corresponding special effect video frame in the video is replaced with the replacement video frame.

In some embodiments, a non-transitory storage medium including the instruction, such as the memory 604 including the instruction, is further provided. The above instruction may be executed by the processor 620 of the electronic device 600 to complete the above method. For example, the non-transitory storage medium may be the ROM, a random access memory (RAM), a CD-ROM, a magnetic tape, a floppy disk, optical data storage device or the like.

Figure 6:
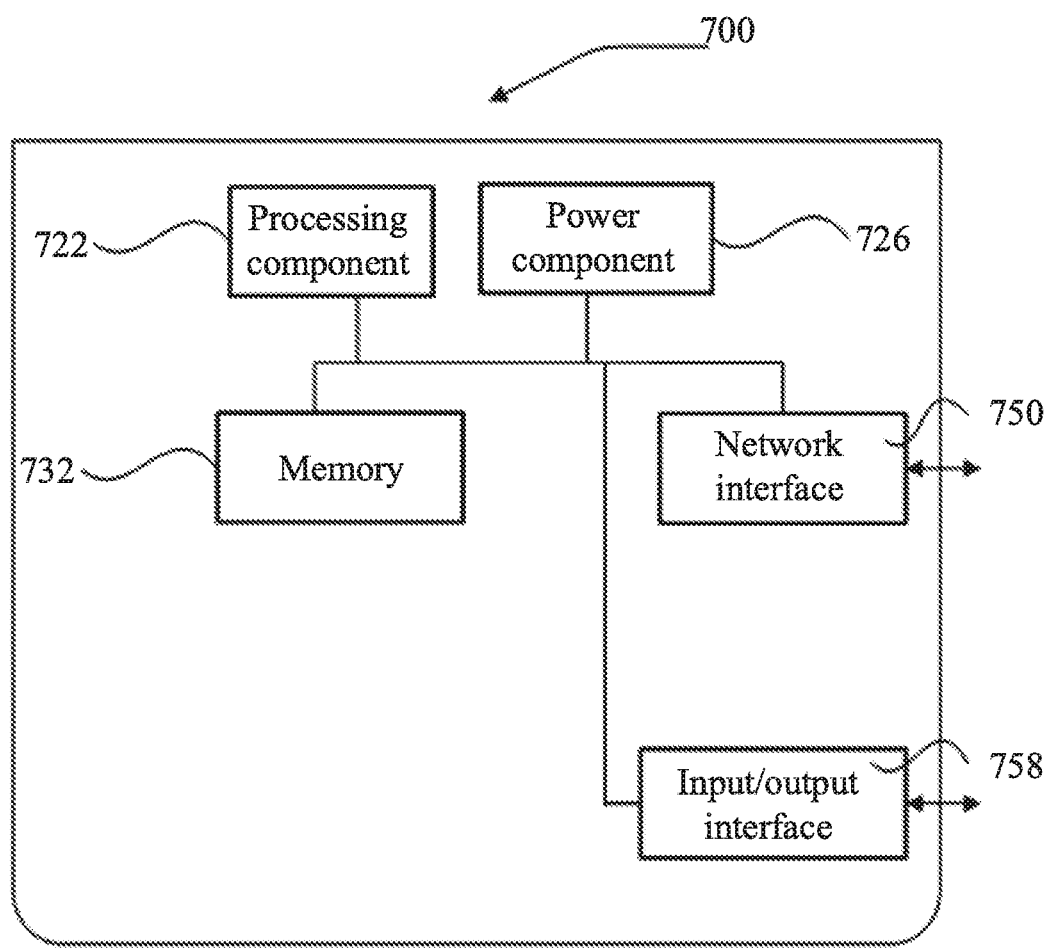
FIG. 6 is a logic block diagram of an electronic device according to another embodiment of the present disclosure.

FIG. 6 is a block diagram of an electronic device 700 according to an exemplary embodiment. For example, the electronic device 700 may be provided as a server. Referring to FIG. 6, the electronic device 700 includes a processing component 722 further including one or more processors, and memory resources represented by a memory 732 configured to store an instruction capable of being executed by the processing component 722, such as an application program. The application program stored in the memory 732 may include one or more modules, wherein each of the modules corresponds to the set of instructions. In addition, the processing component 722 is configured to execute the instruction to perform acquiring a special effect video frame set with a preset special effect map in a video. A mask corresponding to a target feature area is extracted from the special effect video frame. If a shielded area exists in the target feature area of the mask, a weight value of the special effect video frame is determined according to topological relation information corresponding to the special effect video frame, the mask and a preset legal key point. According to the special effect video frame and the weight value, a corresponding replacement video frame is generated. The replacement video frame replaces the corresponding special effect video frame in the video.

The electronic device 700 may further include a power component 726 configured to perform power management of the electronic device 700, a wired or wireless network interface 750 configured to connect the electronic device 700 to a network, and an input/output (I/O) interface 758. The electronic device 700 may operate an operating system based on being stored in the memory 732, such as Windows Server™, Mac OS X™, Unix™, Linux™, FreeBSD™, or the like.

The embodiments of the present disclosure further provide an application program. When the application program is executed by a processor of electronic device, a method provided by the present disclosure is implemented, wherein the method includes steps that the special effect video frame set with the preset special effect map in the video may be obtained, the mask corresponding to the target feature area is extracted from the special effect video frame, if the shielded area exists in the target feature area of the mask, the weight value of the special effect video frame is determined according to the topological relation information corresponding to the special effect video frame, the mask and the preset legal key point, according to the special effect video frame and the weight value, the corresponding replacement video frame is generated, and the replacement video frame replaces the corresponding special effect video frame in the video.

Other embodiments of the present disclosure will be apparent to those skilled in the art from consideration of the specification and practice of the disclosure herein. The disclosure is intended to cover any variations, uses, or adaptations of the present disclosure following the general principles thereof and including such departures from the disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A device for processing a video, comprising a memory and at least one processor, wherein the at least one processor is configured to read and execute instructions stored in the memory to:
   determine a special effect video frame of the video, wherein a target feature area of the special effect video frame comprises a preset special effect map;
   extract a mask corresponding to the special effect video frame;
   determine a weight value of the special effect video frame based on topological relation information corresponding to the special effect video frame, the mask and a preset legal key point upon determining that the shielded area exists in the target feature area of the mask;
   generate a replacing video frame based on the special effect video frame and the weight value; and
   replace the special effect video frame with the replacing video frame.

2. The device according to claim 1, wherein the at least one processor is further configured to read and execute instructions stored in the memory to:
   map the mask to an empty graph layer based on the topological relation information, the mask, and the preset legal key point, wherein the empty graph layer has a preset size; and
   obtain the weight value based on channel information of the empty graph layer, after setting transparency of the empty graph layer to a preset degree.

3. The device according to claim 2, wherein the at least one processor is further configured to read and execute instructions stored in the memory to:
   obtain a legal image with the preset size, wherein the legal image comprises the target feature area; and
   extract the preset legal key point from the target feature area.

4. The device according to claim 2, wherein the at least one processor is further configured to read and execute instructions stored in the memory to:
   extract a pixel value of each pixel in the empty graph layer;
   determine a swipe area value according to the pixel value of each pixel; and
   replace the special effect map with another special effect map in response to the swipe area value being greater than or equal to a first preset threshold value.

5. The device according to claim 4, wherein the at least one processor is further configured to read and execute instructions stored in the memory to:
   determine a plurality of target pixels whose pixel values are greater than or equal to a second preset threshold value from all the pixels of the empty graph layer; and
   take a ratio of a sum of the pixel values of the target pixels to the number of the target pixels as the swipe area value.

6. The device according to claim 4, wherein the at least one processor is further configured to read and execute instructions stored in the memory to:
   send the empty graph layer to a central processing unit through a graphics processor; and
   extract the pixel value of each pixel in the empty graph layer by the central processing unit.

7. The device according to claim 1, wherein the at least one processor is further configured to read and execute instructions stored in the memory to:
   determine the weight value of the special effect video frame based on the topological relation information, the mask and the preset legal key point upon determining that a non-mask area exists in the target feature area of the mask.

8. The device according to claim 1, wherein the at least one processor is further configured to read and execute instructions stored in the memory to:
   extract a plurality of video frames of the video based on a preset time period;
   collect a plurality of target key points of target feature areas in the video frames; and determine the topological relation information based on relative position vector information among the plurality of target key points.

9. The device according to claim 1, wherein the at least one processor is further configured to read and execute instructions stored in the memory to:
increase a size of the mask based on a preset multiple; and
fuzz the mask.

10. A non-transitory computer readable storage medium, wherein the computer readable storage medium is stored with instructions thereon, and the instructions are executed by a processor to:
determine a special effect video frame of the video, wherein a target feature area of the special effect video frame comprises a preset special effect map;
extract a mask corresponding to the special effect video frame;
determine a weight value of the special effect video frame based on topological relation information corresponding to the special effect video frame, the mask and a preset legal key point upon determining that the shielded area exists in the target feature area of the mask;
generate a replacing video frame based on the special effect video frame and the weight value; and
replace the special effect video frame with the replacing video frame.

11. The non-transitory computer readable storage medium according to claim 10, wherein the instructions are executed by the processor to:
map the mask to an empty graph layer based on the topological relation information, the mask, and the preset legal key point, wherein the empty graph layer has a preset size; and
obtain the weight value based on channel information of the empty graph layer, after setting transparency of the empty graph layer to a preset degree.

12. The non-transitory computer readable storage medium according to claim 11, wherein the instructions are executed by the processor to:
obtain a legal image with the preset size, wherein the legal image comprises the target feature area; and
extract the preset legal key point from the target feature area.

13. The non-transitory computer readable storage medium according to claim 11, wherein the instructions are executed by the processor to:
extract a pixel value of each pixel in the empty graph layer;
determine a swipe area value according to the pixel value of each pixel; and
replace the special effect map with another special effect map in response to the swipe area value being greater than or equal to a first preset threshold value.

14. The non-transitory computer readable storage medium according to claim 13, wherein the instructions are executed by the processor to:
determine a plurality of target pixels whose pixel values are greater than or equal to a second preset threshold value from all the pixels of the empty graph layer; and
take a ratio of a sum of the pixel values of the target pixels to the number of the target pixels as the swipe area value.

15. The non-transitory computer readable storage medium according to claim 13, wherein the instructions are executed by the processor to:
send the empty graph layer to a central processing unit through a graphics processor; and
extract the pixel value of each pixel in the empty graph layer by the central processing unit.

16. The non-transitory computer readable storage medium according to claim 10, wherein the instructions are executed by the processor to:
determine the weight value of the special effect video frame based on the topological relation information, the mask and the preset legal key point upon determining that a non-mask area exists in the target feature area of the mask.

17. The non-transitory computer readable storage medium according to claim 10, wherein the instructions are executed by the processor to:
extract a plurality of video frames of the video based on a preset time period;
collect a plurality of target key points of target feature areas in the video frames; and
determine the topological relation information based on relative position vector information among the plurality of target key points.

18. The non-transitory computer readable storage medium according to claim 10, wherein the instructions are executed by the processor to:
increase a size of the mask based on a preset multiple; and
fuzz the mask.

* * * * *